UNITED STATES PATENT OFFICE.

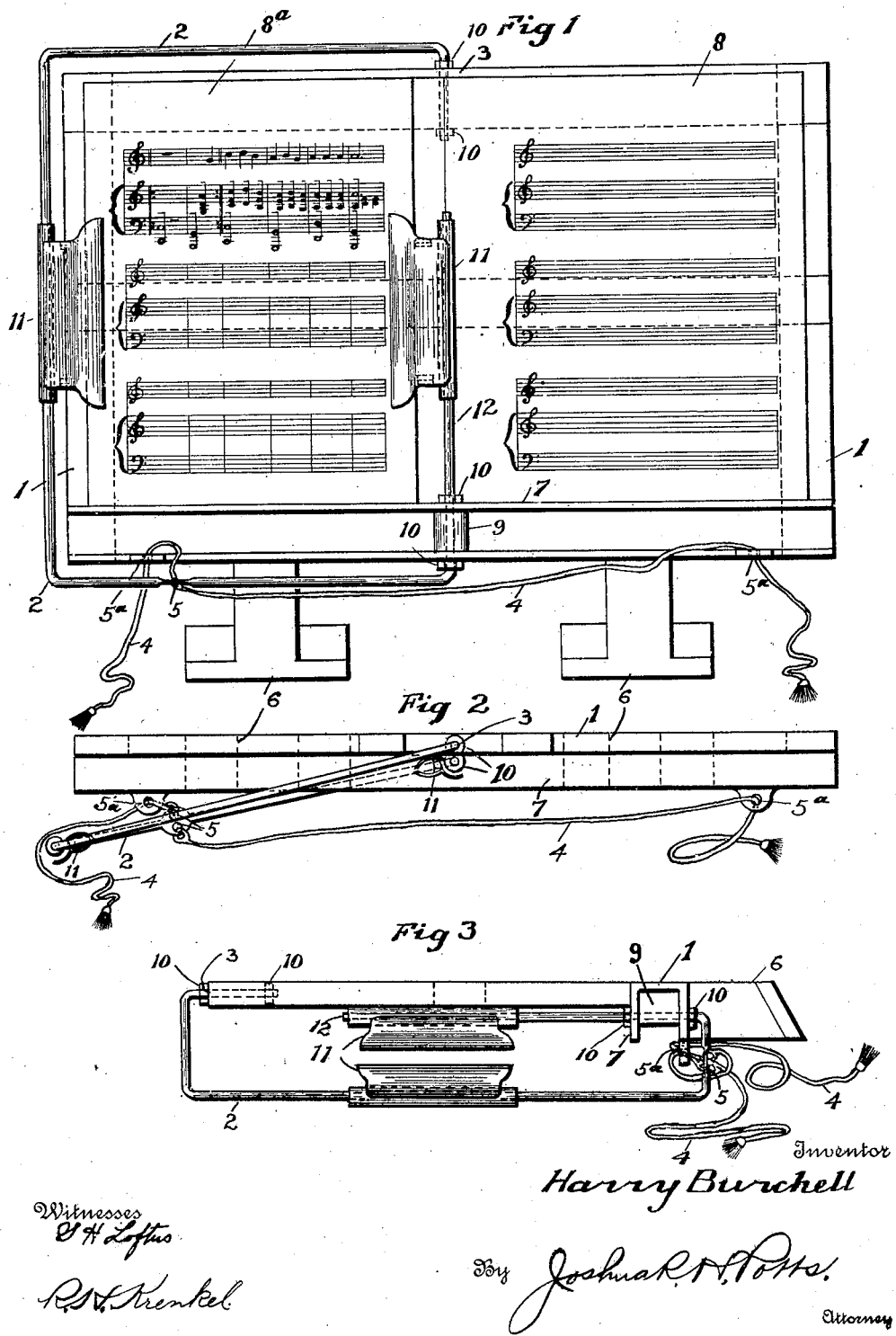

HARRY BURCHELL, OF PHILADELPHIA, PENNSYLVANIA.

MUSIC-LEAF TURNER.

996,208.  Specification of Letters Patent.  Patented June 27, 1911.

Application filed March 7, 1910.  Serial No. 547,664.

*To all whom it may concern:*

Be it known that I, HARRY BURCHELL, a citizen of the United States, residing at Philadelphia, in the county of Philadelphia and State of Pennsylvania, have invented certain new and useful Improvements in Music-Leaf Turners, of which the following is a specification.

My invention relates to improvements in music leaf turners, the object of the invention being to provide an extremely, simple, inexpensive device of this character which will securely hold the music in place, and enable the sheet or page to be turned back or forth as may be desired in the playing of the piece.

With these and other objects in view, the invention consists in certain novel features of construction, and combinations and arrangements of parts as will be more fully hereinafter described and pointed out in the claim.

In the accompanying drawings: Figure 1, is a view in front elevation illustrating my improvements. Fig. 2, is a top view, and Fig. 3, is an end view.

1, represents the backing or supporting frame, which may be made of any suitable material preferably light, having a base bar 7, preferably of metal, so as to give weight to the base of the support, and the latter is mounted upon suitable feet 6, having beveled lower edges as shown, so that the device will assume a natural incline on a piano music rest.

2, represents a swinging wire bail of general rectangular form, one end projecting up through a bearing 9, in bar 7, and extending up an appreciable distance so as to bear against the double outside sheet of music, illustrated at 8, to hold the latter against the support 1. The other end of bail 2, extends down through the top bar 3, of support 1, and these ends of the bail are supported against vertical movement by nuts 10, as clearly shown.

8ª, represents the loose sheet or page which is caught in clamps 11, on the intermediate portion of bail 2, and on the upwardly extending portion 12, which serves to hold the double sheet 8. The lower member of bail 2, is flattened as shown, and provided with eyes 5, in which cords 4, are secured. These cords 4, are passed through eyes 5ª, on bar 7, and extend downward as shown. It will be noted that when the right hand cord 4, is pulled, the bail 2, will be swung to the right, so as to turn the page 8ª, to the right, and when the left hand cord 4, is pulled, the page 8ª, will be swung to the left.

The feet 6, lie in the path of the swinging movement of the bail 2, so that the bail never lies flat against support 1, hence the bail is always at an incline and can be easily and quickly moved by the cords 4.

In practically all instrumental music, there are just four pages, one leaf being loose, so that when this loose leaf is caught in clamps 11, it may be turned back and forth at will.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention what I claim as new and desire to secure by Letters Patent is:

A music leaf turner comprising a support, a single integral swinging bail pivoted to the support, clamps on said bail for clamping opposite edges of a loose inner music leaf, and means for swinging said bail, said bail comprising a single piece of wire bent into substantially rectangular form, the two ends of the wire being vertically disposed out of alinement with each other and arranged in bearings in said support, and one of said ends being extended beyond its bearings and lying against the front face of said support to exert spring pressure against the intermediate portion of the outer double music sheet when said sheet is inserted between said end and said support, substantially as described.

In testimony whereof I have signed my name to this specification in the presence of two subscribing witnesses.

HARRY BURCHELL.

Witnesses:
 C. R. ZIEGLER,
 CHAS. E. POTTS.

---

Copies of this patent may be obtained for five cents each, by addressing the "Commissioner of Patents, Washington, D. C."